United States Patent
Tilli

(10) Patent No.: US 11,166,171 B2
(45) Date of Patent: Nov. 2, 2021

(54) GLOBAL OPTIMIZATION PROCESS FOR LINK ASSOCIATIONS

(71) Applicant: NOKIA SOLUTIONS AND NETWORKS OY, Espoo (FI)

(72) Inventor: Juha-Matti Tilli, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/644,702

(22) PCT Filed: Sep. 15, 2017

(86) PCT No.: PCT/EP2017/073324
§ 371 (c)(1),
(2) Date: Mar. 5, 2020

(87) PCT Pub. No.: WO2019/052658
PCT Pub. Date: Mar. 21, 2019

(65) Prior Publication Data
US 2020/0288327 A1    Sep. 10, 2020

(51) Int. Cl.
*H04W 4/00* (2018.01)
*H04W 16/22* (2009.01)
(Continued)

(52) U.S. Cl.
CPC ........... *H04W 16/22* (2013.01); *H04W 28/06* (2013.01); *H04W 28/0942* (2020.05); *H04W 36/22* (2013.01); *H04W 36/30* (2013.01)

(58) Field of Classification Search
USPC ..... 455/436, 446, 67.11; 370/329, 328, 330, 370/331; 342/450, 357.29
See application file for complete search history.

(56) References Cited

U.S. PATENT DOCUMENTS

| 2006/0128312 A1* | 6/2006 | Declerck | H04W 36/30 455/67.11 |
| 2010/0136985 A1* | 6/2010 | Inoue | H04W 16/08 455/446 |

(Continued)

FOREIGN PATENT DOCUMENTS

EP    2 723 123 A1    4/2014

OTHER PUBLICATIONS

International Search Report and Written Opinion dated Mar. 27, 2018 corresponding to International Patent Application No. PCT/EP2017/073324.

(Continued)

*Primary Examiner* — David Q Nguyen
(74) *Attorney, Agent, or Firm* — Squire Patton Boggs (US) LLP

(57) ABSTRACT

According to an aspect, a method comprises acquiring, by a network coordinator apparatus, measurement data indicating link conditions between the access nodes and terminal devices served by the access nodes of a cellular communication system. A network coordinator apparatus builds a globally optimized operating model on the basis of the measurement data by at least simulating a change in at least one association between the access nodes and the terminal devices. Based on the measurement data, an effect of the simulated change on overall performance of the cellular communication system is determined. Upon completing the building, the network coordinator apparatus transmits one or more handover instructions for handover of an association of one or more of the terminal devices according to the built operating model.

20 Claims, 4 Drawing Sheets

(51) Int. Cl.
*H04W 28/08* (2009.01)
*H04W 28/06* (2009.01)
*H04W 36/22* (2009.01)
*H04W 36/30* (2009.01)

(56) References Cited

U.S. PATENT DOCUMENTS

| | | | | |
|---|---|---|---|---|
| 2011/0300871 | A1* | 12/2011 | Dottling | H04W 24/02 455/446 |
| 2012/0119949 | A1* | 5/2012 | Takahashi | G01S 19/46 342/357.29 |
| 2014/0295840 | A1* | 10/2014 | Keskitalo | H04W 24/10 455/436 |
| 2014/0317461 | A1* | 10/2014 | Li | H04L 43/50 714/712 |
| 2015/0097731 | A1* | 4/2015 | Russell | G01S 19/48 342/450 |
| 2017/0070396 | A1 | 3/2017 | Flanagan et al. | |
| 2017/0332302 | A1* | 11/2017 | Ercan | H04W 36/00837 |
| 2018/0062810 | A1* | 3/2018 | Vitthaladevuni | H04W 52/146 |

OTHER PUBLICATIONS

J. Sanchez-Gonzalez et al: "A comparison of different optimization search methodologies for self-optimisation in wireless cellular networks," Wireless and Mobile Networking Conference (WMNC), 2013 6th Joint IFIP, IEEE, Apr. 23, 2013, pp. 1-8, XP032432274.

Raisha Nazmul et al: "Radio network optimization," 2015 International Conference on Advances in Electrical Engineering (ICAEE), IEEE, Dec. 17, 2015, pp. 194-197, XP032920386.

Communication pursuant to Article 94(3) EPC issued in corresponding European Patent Application No. 17768121.0 dated Jul. 13, 2021.

First Examination Report issued in corresponding Indian Patent Application No. 202047015528 dated Aug. 31, 2021.

* cited by examiner

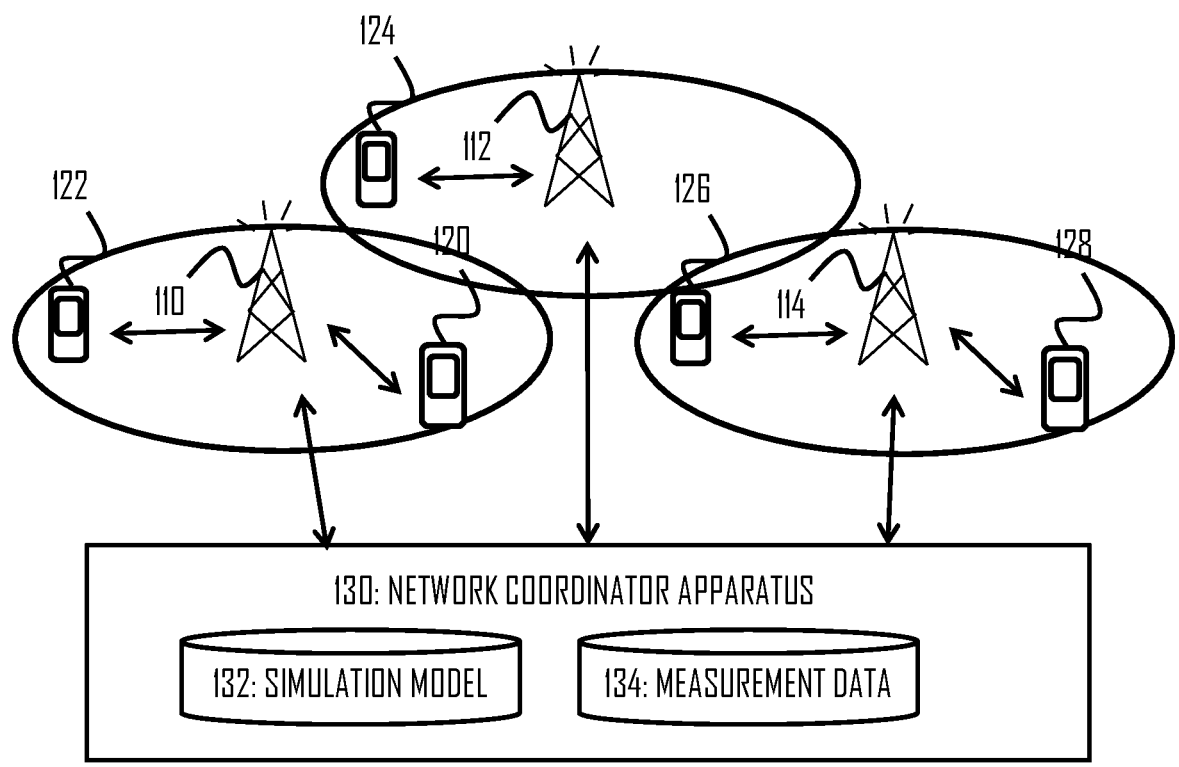
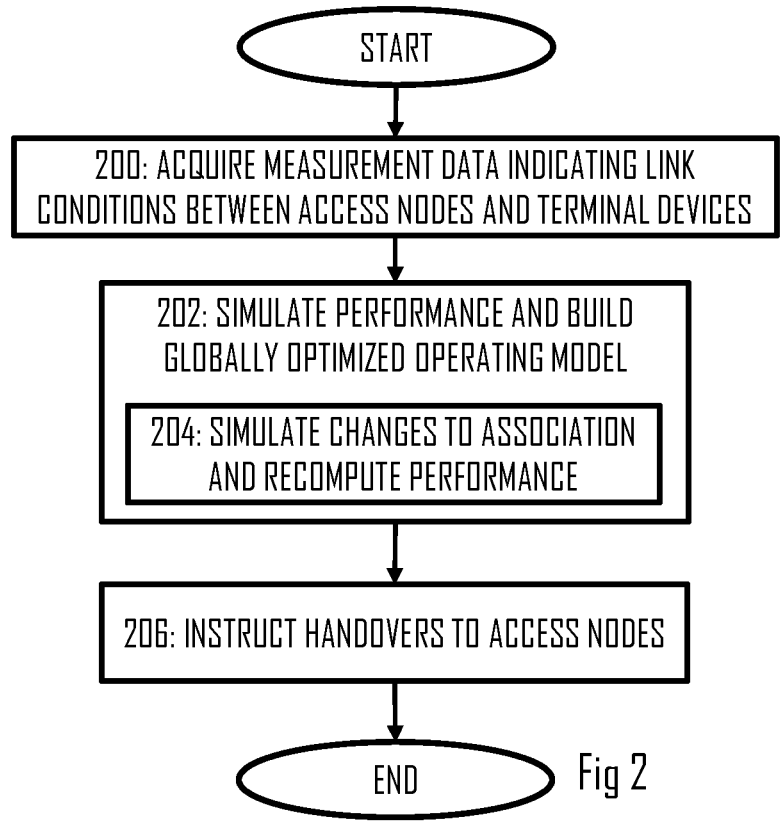

GLOBAL OPTIMIZATION PROCESS FOR LINK ASSOCIATIONS

FIELD

The invention relates to optimization of performance of a cellular communication system and, in particular, to optimizing associations between access nodes and terminal devices of the cellular communication system.

BACKGROUND

Network operators worldwide have made vast investments to infrastructures of cellular communication systems. Any savings or optimization to performance of a network infrastructure will have a significant benefit in terms of costs. One manner of affecting savings in the investments is to use limited resources more efficiently. Current cellular access networks operate such that a cell providing the best link condition is selected for each terminal device. This decision is made locally in an access node such as evolved Node B (eNB). This ensures link availability, but may be sub-optimal in terms of load balancing. The operator can employ hot spots in areas where there exist problems of overloading. However, it is virtually impossible with limited resources to exactly match the capacity and demand that may change over time by using such a solution.

BRIEF DESCRIPTION OF THE INVENTION

The invention is defined by the subject-matter of the independent claims. Embodiments are defined in the dependent claims.

LIST OF DRAWINGS

In the following, the invention will be described in greater detail with reference to the embodiments and the accompanying drawings, in which FIG. 1 illustrates a wireless access network to which embodiments of the invention may be applied;

FIG. 2 illustrates a process for building a globally optimized association model in a cellular communication system according to an embodiment of the invention;

DESCRIPTION OF EMBODIMENTS

Figure 3:
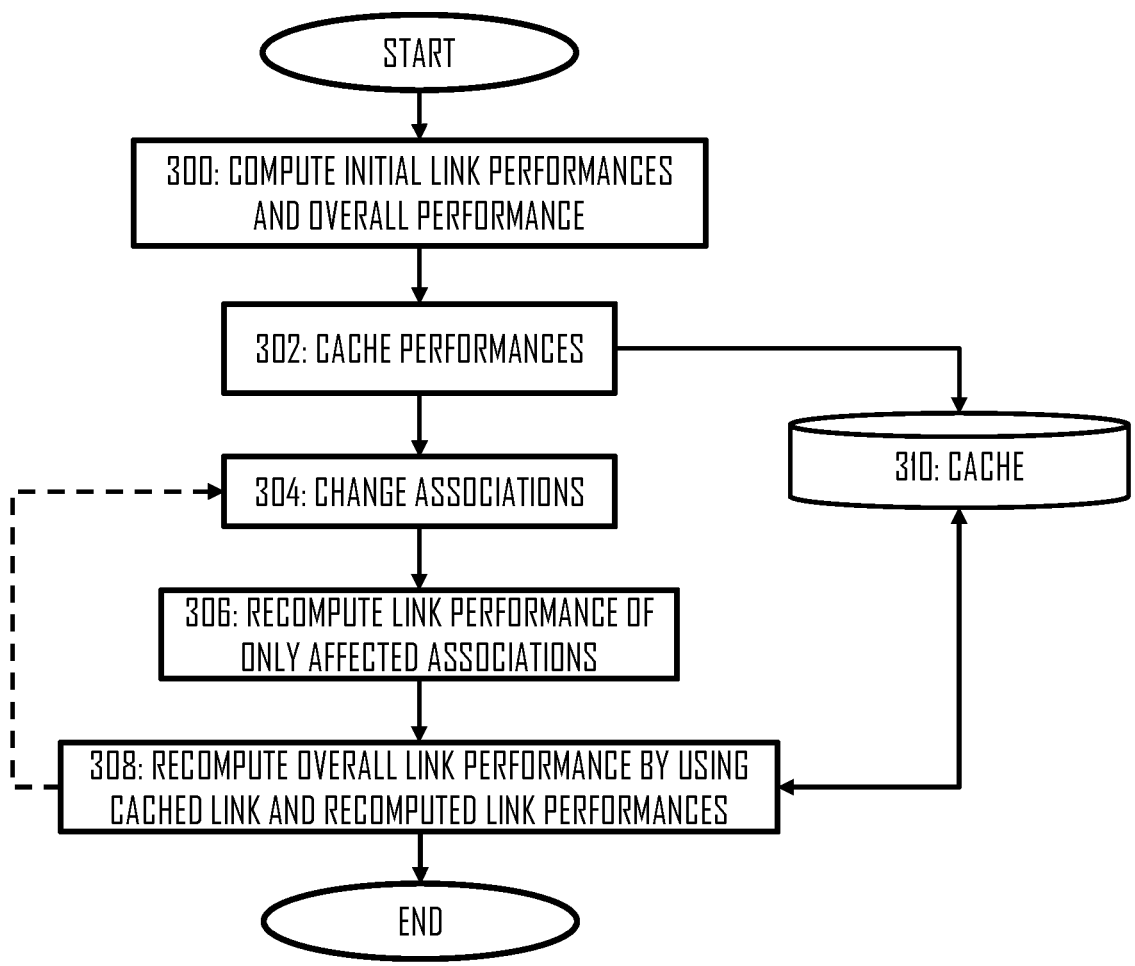
FIG. 3 illustrates the process of building the globally optimized association model in greater detail according to an embodiment.

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a cellular communication system, such as in at least one of the following: Global System for Mobile Communications (GSM) or any other second generation cellular communication system, Universal Mobile Telecommunication System (UMTS, 3G) based on basic wideband-code division multiple access (W-CDMA), high-speed packet access (HSPA), Long Term Evolution (LTE), LTE-Advanced, a system based on IEEE 802.11 specifications, a system based on IEEE 802.15 specifications, and/or a fifth generation (5G) mobile or cellular communication system The embodiments are not, however, restricted to the system given as an example but a person skilled in the art may apply the solution to other communication systems provided with necessary properties. One example of a suitable communications system is the 5G system, as listed above. 5G has been envisaged to use multiple-input-multiple-output (MIMO) multi-antenna transmission techniques, more base stations or nodes than the current network deployments of LTE, by using a so-called small cell concept including macro sites operating in co-operation with smaller local area access nodes and perhaps also employing a variety of radio technologies for better coverage and enhanced data rates. 5G will likely be comprised of more than one radio access technology (RAT), each optimized for certain use cases and/or spectrum. 5G system may also incorporate both cellular (3GPP) and non-cellular (e.g. IEEE) technologies. 5G mobile communications will have a wider range of use cases and related applications including video streaming, augmented reality, different ways of data sharing and various forms of machine type applications, including vehicular safety, different sensors and real-time control. 5G is expected to have multiple radio interfaces, including apart from earlier deployed frequencies below 6 GHz, also higher, that is cmWave and mmWave frequencies, and also being capable of integrating with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as inter-RI operability between cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or cloud data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent. Some other technology advancements probably to be used are Software-Defined Networking (SDN), Big Data, and all-IP, which may change the way networks are being constructed and managed.

FIG. 1 illustrates an example of a cellular communication system to which some embodiments of the invention may be applied. The system may comprise access nodes 110, 112, 114 providing and managing respective cells. A cell may be a macro cell, a micro cell, femto cell, or a pico cell, for example. From another point of view, the cell may define a coverage area or a service area of the access node. The access nodes 110 to 114 may each be an evolved Node B (eNB) as in the LTE and LTE-A, an access point of an IEEE 802.11-based network (Wi-Fi or wireless local area network, WLAN), or any other apparatus capable of controlling radio communication and managing radio resources within a cell. For 5G solutions, the implementation may be similar to LTE-A, as described above. The access node may equally be called a base station or a network node. The system may be a wireless communication system composed of a radio access network of access nodes, each controlling a respective cell or cells. The access nodes may provide terminal devices (UEs) 120, 122, 124, 126, 128 with wireless access to other networks such as the Internet. The terminal device may also be called a station.

The number of access nodes in the system may be very high, e.g. from hundreds to tens of thousands of access nodes, which is typical for operators providing services throughout a country or a state. In the case of multiple access nodes in the communication network, the access nodes may be connected to each other with an interface. LTE specifications call such an interface as X2 interface. In IEEE 802.11 networks, a similar interface may be provided between access points. An LTE access node and a WLAN access node may be connected, for example via Xw interface. Other wired or wireless communication methods between the access nodes may also be possible. The access nodes may be further connected via another interface to a core network 130 of the cellular communication system. The LTE specifications specify the core network as an evolved packet core (EPC), and the core network may comprise a mobility management entity (MME) and a gateway (GW) node. In the LTE system, the GW may be a serving gateway (S-GW) or a packet data network gateway (P-GW). The MME may handle mobility of terminal devices in a tracking area encompassing a plurality of cells and also handle signalling connections between the terminal devices and the core network. The MME may further carry out authentication and integrity protection for terminal devices 120 to 128. The gateway node may handle data routing in the core network and to/from the terminal devices.

The core network and a radio network of access nodes may form a wireless access network providing the terminal devices 120 to 128 with wireless access and data transfer capability with the other networks. In order to provide the wireless access, the wireless access network may first establish a connection with the terminal device. The connection establishment may include establishment of a radio connection such as a radio resource control (RRC) connection between the access node 110 and the terminal device and, furthermore, it may include establishment of a core network connection between the core network 130 and the terminal device. The connection establishment may be understood as creating an association between the terminal device and the access node. The connection establishment may include authentication of the terminal device. The authentication may be performed by the MME, a dedicated authentication server or, in general, any network node of the wireless access network capable of performing the authentication. A terminal device that has an association such as a RRC connection with the access node may be configured for data transfer with the access node and the other networks.

Embodiments of the present invention employ a global optimization of the associations between the terminal devices and the access nodes of the cellular communication system. The global optimization may be carried out in a network coordinator apparatus 130 that may be a realized by one or more server computers in the cellular communication system or connected to the cellular communication system. Each access node 110 to 114 may have a communication connection, e.g. an internet protocol (IP) connection, with the network coordinator apparatus 130.

The network coordinator apparatus 130 may receive, from the access nodes and/or the terminal devices of the system measurement data indicating link conditions of present associations. For each terminal device, the measurement data may include a channel quality in terms of signal-to-noise ratio (SNR), for example, to each access node the terminal device is capable of detecting. Such information is readily maintained in a neighbour list of the terminal device for handover purposes. The measurement data may further or alternatively comprise an estimate of data transfer capacity required by the terminal device. Such information may be acquired from recent data transfer history, amount of data currently in a transmission buffer of the terminal device, a radio resource control mode such as an idle mode or a connected mode, or through other means. The network coordinator apparatus may store the measurement data in a database 134. The network coordinator may also store a simulation model 132 comprising computer program instructions for executing an optimization procedure on the basis of the measurement data.

FIG. 2 illustrates a process for optimizing performance of the cellular communication system. Referring to FIG. 2, the process comprises as performed by the network coordinator apparatus: acquiring (block 200) measurement data indicating link conditions between the access nodes and terminal devices served by the access nodes; building (block 202) a globally optimized operating model on the basis of the measurement data by at least simulating (block 204) a change in at least one association between the access nodes and the terminal devices and determining, on the basis of the measurement data, an effect of the simulated change on overall performance of the cellular communication system and, upon completing said building, transmitting (block 206) one or more handover instructions for handover of an association of one or more of the terminal devices according to the built operating model.

In a special case, associations in the built global optimization model may correspond to the current associations in the cellular communication system. In such a case, the system has already been optimized and no new handover instructions needs to be issued in block 206.

The number of associations considered when building the global model may be over a thousand, over ten thousand, over a hundred thousand, or even over a million.

The measurement data may provide the network coordinator apparatus with information on cells each terminal device is capable of detecting and with which channel quality. The network coordinator apparatus may use this information to estimate a link performance. In an embodiment, the link performance for a terminal device is an estimate of channel capacity in bits per second based on the SNR and a bandwidth available to the terminal device. In the simplest implementation, the formula may be the Shannon's channel capacity formula, but more accurate estimates may equally be used.

The measurement data 134 may include a terminal device data structure and a cell data structure. The terminal device data structure may store the SNRs (or other channel quality metrics) between the terminal device and all cells it is capable of detecting. It may also stores a list of preferred cells that have a signal to noise ratio above a certain threshold. Additionally, it may store information on the current association, e.g. the current serving cell, and data rate requirement. The cell data structure may store an aggregate bitrate or utility of mobile devices using this cell. The utility is described below. It may also store a list of terminal devices associated to the cell.

Now, the network coordinator apparatus has information that it can use when planning possible cell selections and their effect of the performance of the system. The network coordinator apparatus may further define a resource allocation policy for use in determining how large share of a given cell's capacity a particular terminal device may get. This resource allocation policy may comply with an actual resource allocation algorithm used in the access nodes. In a simple implementation, the resource allocation algorithm may use any implementation of commonly used max-min fairness policy. Algorithms for implementing said max-min fairness can be found in the literature and won't be reproduced here. The resource allocation policy and the channel capacity formula can be used together to divide a certain frequency bandwidth of a cell to terminal devices associated with the cell, and then further convert the divided frequency blocks to respective data rates by using the channel capacity formula. In this manner, a data rate may be determined for an arbitrary terminal device associated with an arbitrary cell and allocated with an arbitrary frequency band.

The globally optimized model may be built for terminal devices throughout the coverage area of the system, depending on the processing capacity of the network coordinator apparatus. Embodiments described below provide tools for reducing the computational complexity without sacrificing the performance of the optimization.

FIG. 3 illustrates a process for performing the building of the optimized model. FIG. 3 thus illustrates an embodiment of block 202. Before starting the optimization, the network coordinator apparatus may first select terminal devices for which optimization is performed. In an embodiment, the optimization is made only for a subset of terminal device registered to the system.

In an embodiment, only the terminal devices in a connected mode with respect to an access node of the system are included in the optimization.

In an embodiment, only a subset of the terminal devices in the connected mode are included in the optimization. For example, only those terminal device that have transferred data over an amount defined by a threshold within a determined time window are included. Regarding this embodiment, actual data rates in the very recent history may be evaluated, and those terminal devices for which the actual data rates indicate they are actively transferring data are selected for optimization. This may be defined by the threshold. The data rate requirement for the selected terminal devices can be estimated e.g. by increasing the actual data rates by a determined amount. The determination of the amount of increase in the actual data rates may be based on an average size of transmission buffers in the recent history.

The selection of the terminal devices to be included in the optimization may be made by the access nodes. The network coordinator apparatus may request the access nodes to enlist the terminal devices to the optimization process. Upon receiving the request, the access nodes may select the terminal devices by using any one of the above-described criteria, for example, and indicate the selected terminal devices and their respective measurement data to the network coordinator apparatus. In another embodiment, the access nodes enlist the terminal devices to the network coordinator apparatus, and the network coordinator apparatus requests the measurement data of the enlisted terminal devices from the enlisted terminal devices and/or from the access nodes.

When the terminal devices have been selected, an initial system setup may be determined. In the initial system setup, the current associations between the terminal devices and the access nodes may be employed. In another embodiment, each terminal device may be associated with an access node providing the best channel quality for the terminal device, e.g. the highest signal power. Other schemes for defining the initial system setup may be used as well. Then, initial link performances and initial overall performance of the initial system setup may be computed by using the measurement data (block 300). An initial cell-specific performance may also be computed in block 300, indicating an initial overall performance for each cell. The initial cell-specific performance for a cell may be computed as an aggregate of initial link performances of terminal device associated with the cell in the initial system setup. The overall system performance may be computed as an aggregate of either the initial cell-specific performance or the initial link performances.

An embodiment of the initial link performance is the data rate computed in the above-described manner, and the overall performance is an aggregate data rate of the selected terminal devices. However, optimization of data rates can lead to unfair results: it is possible that in the end of the optimization a terminal device with the best channel quality towards a cell is the sole user of the cell and all the other terminal devices share the capacity of another cell.

In order to prevent such unfairness, an embodiment employs a utility as the link performance and overall utility as the overall performance. The overall utility may be computed as an aggregate of utilities of individual links. The utility may define how much the terminal device benefits from a given data rate. For example for low data rates such as 100 kbps (kilobits per second), an increase of another 100 kbps is a significant increase in quality of experience (QoE). However, for high data rates such as 20 Mbps (Megabits per second) the increase of 100 kbps is insignificant. This embodiment may employ a mapping function that maps each data rate to a value describing the utility. The mapping may be defined a natural logarithm function, for example, such that as the data rate increases the utility also increases but in a logarithmic manner so that at higher data rates the utility increase more slowly than at lower data rates. Another example of the utility function is $-1/R$ where R is the data rate. In this case, a negative utility is interpreted as a cost.

Yet another embodiment of the link performance is a QoE metric. In principle, the data rate or the utility can be considered as examples of the QoE metric. Bandwidth allocated to a given terminal device is another example of the link performance.

Upon computing the initial performance values, e.g. utility values, the network coordinator apparatus may cache the values in a cache 310. The cache 310 may store the link performance for each terminal device, the cell-specific performance for each cell, and the overall performance.

Thereafter, the network coordinator apparatus may change the initial system model by changing at least one association of the initial system model (block 304). In more detail, one or more terminal devices may be transferred from one cell to another cell in the model. Even in the case where the current real associations are used as the initial system model, the change made in block 304 does not affect the real association at this stage.

In an embodiment, the changed association is selected randomly.

In another embodiment, the changed association is selected by considering traffic load in the cells. For example, a terminal device associated to a cell with high utilization of frequency resources may be switched to another cell the terminal device can detect and having better capacity to accommodate the terminal device. Other embodiments may equally be used.

After carrying out the change in block 304, the network coordinator apparatus may recompute the performances (block 306), e.g. the link performances, cell-specific performances, and the overall performance. In an embodiment, the recomputation is performed only for the terminal devices and cells affected by the change in block 304. For example, if a terminal device is switched from cell A to cell B, block 306 may include or consist of recomputation of the link performance of the terminal device in cell B and, in some embodiments, recomputation of the cell-specific performance of the cell A now without the terminal device and the cell-specific performance of the cell B now with the terminal device having allocated bandwidth. In some embodiments where the cell-specific performance is omitted, the recomputation of the cell-specific performance is also omitted.

Then, the overall performance may be recomputed in block 308 by utilizing the recomputation results acquired in block 306 and the cached link performance values and/or the cell-specific performance values for the cells not affected by the change acquired from the cache 310. As described above, the overall performance may be an aggregate of the link performances and/or the cell-specific performances. Then, the network coordinator apparatus may determine whether or not to maintain the change. Details of the selection are described below. In case the change is maintained, block 308 may also comprise updating the cache with the recomputation results from block 306 to reflect the change.

Thereafter, it may be decided whether another iteration is needed. If another iteration is determined, the process may return to block 304 for carrying out another change to the associations (dashed line). Otherwise, the process may end and the necessary handovers according to the current association stored in the cache may be effected by causing corresponding handover commands in the access nodes.

As described above, the optimization process may be iterative in the sense that the loop formed by blocks 304, 306, and 308 may be carried out repeatedly. In other words, the procedure of making a change to the associations and computing an effect of the change to the overall performance is carried out repeatedly until the loop is determined to end. Embodiments for ending the process are described below.

The above-described caching reduces the time needed for the optimization. The speed-up may be considered to be by a factor N/2 where N is the number of access nodes. For example, for 400 access nodes the speed-up is 200 times compared with a solution where the recomputation in block 306 is performed from the scratch.

In an embodiment, only those access nodes are involved in the optimization that are capable of providing the involved terminal devices with channel condition higher than a determined threshold, e.g. SNR over the threshold. Accordingly, those access nodes incapable of providing sufficient channel quality are excluded from the optimization, which further reduces the computing time.

Figure 4:
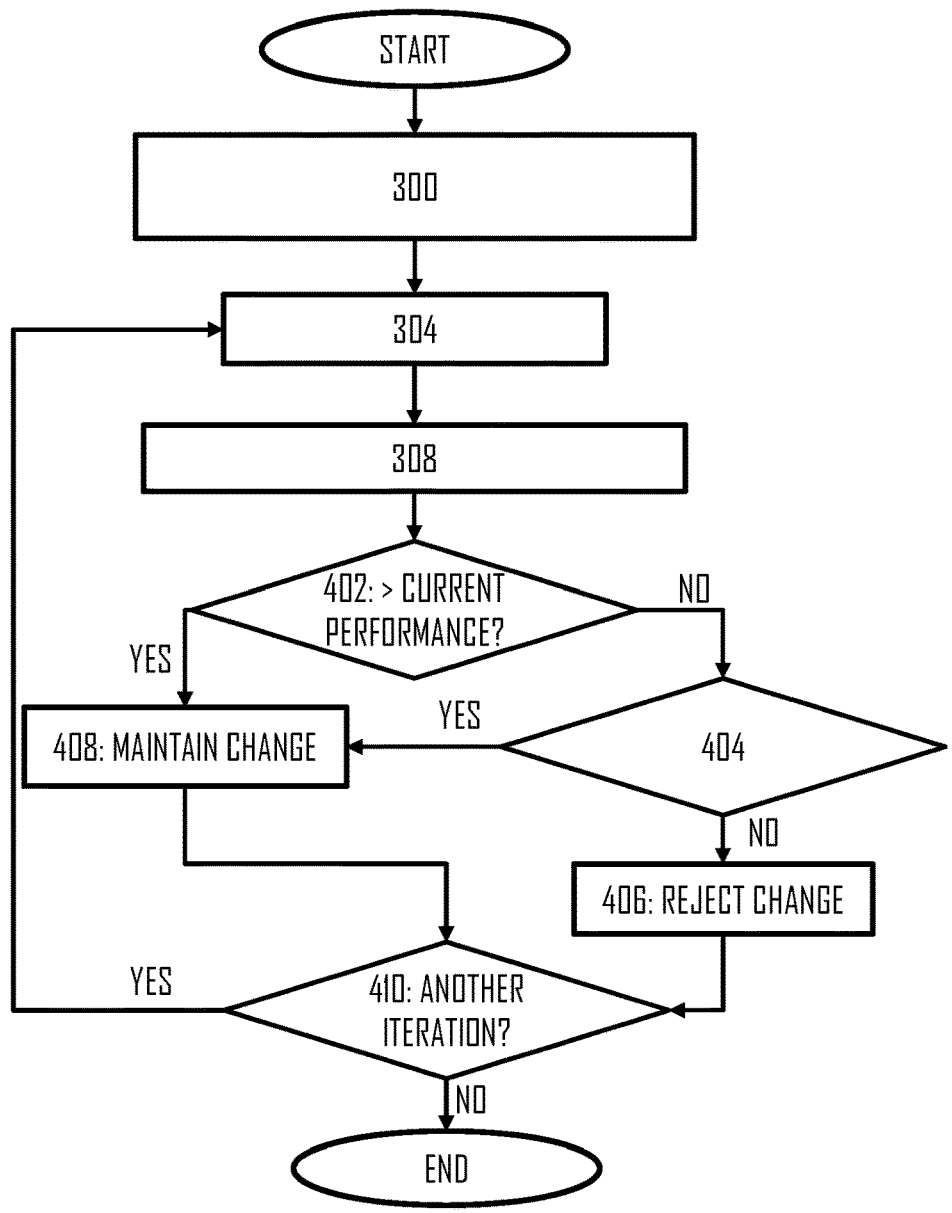
FIG. 4 illustrates selection and continuation of the process of FIG. 3 in greater detail according to some embodiments of the invention.

FIG. 4 illustrates an embodiment of the process of FIG. 3. In particular, details of the selection and the continuation of the iterations are highlighted in greater detail. It should be appreciated that the more generic embodiment of FIG. 3 may be supplemented with the details of the selection and/or the continuation of the iterations. These two aspects are mutually independent.

Referring to FIG. 4, blocks 300, 304, and 308 may be performed in the above-described manner. The embodiment of FIG. 4 may also involve the caching described above, although it is not illustrated in FIG. 4 for the sake of conciseness. Regarding the selection of whether or not to maintain the change made in block 304, the process may, in block 402, determine whether or not the recomputed overall performance is better than the overall performance directly before the change. If the change resulted in the better performance, e.g. better overall data rate or utility, the process may proceed to block 408 where the change is maintained and the cache updated accordingly. If the change resulted in poorer overall performance than the overall performance directly before the change, e.g. a lower overall data rate or utility, the process may proceed to block 404 where further evaluation is performed.

In block 404, it is determined whether or not to maintain the change even if it degrades the overall performance. A threshold may be used in the determination. In an embodiment a random process is built by using the threshold. For example, the following formula may be used as the threshold:

$$p = e^{-(OP(i-1) - OP(i))/T}$$

where e defines a basis of an exponential function and may be a constant such as a base of a natural logarithm (approximately 2.718), OP(i−1) denotes the overall performance directly before the change, OP(i) denotes the overall performance recomputed after the change in block 308, and T is a scaling factor. The scaling factor is described below. The exponent of the formula is formed by a change in the overall performance between directly consecutive iterations scaled by the factor T, e.g. the division by T.

A random variable may then be generated, having a value between zero and one. The random value may be generated between zero and one by using uniform probability distribution. If the random variable is lower than p, the change is maintained (to block 408 from block 404). Otherwise, the change may be rejected (block 406 from block 404) and the previous values in the cache may be maintained. In general, the random value may be compared with the value p of the threshold and it may be determined whether or not the random value is one of greater and lower than the value of the threshold. If the random value is said one of greater and lower than the value p of the threshold, the change is maintained. If the random value p is not said one of greater and lower than the value of the threshold, the change is rejected.

Another embodiment employs a threshold without the random process. For example, if the degradation in the performance is lower than the threshold, the change may still be maintained. If the degradation in the performance is higher than the threshold, the change may be rejected.

From yet another perspective, a random process is employed for making the decision of whether or not to maintain the change in case the change degrades the performance. The random process may be considered as casting dice and making the decision on the basis of the result according to determined rules. The random process may include: determining a probability value defining probability of maintaining the change, generating a random value as described above, and making the decision on the basis of the random value and the probability value. The probability value may define a range for acceptance the change. If the random value falls within the range, the change may be accepted. If the random value falls outside of the range, the change may be rejected. The probability value may be the above-described p.

Figure 5:
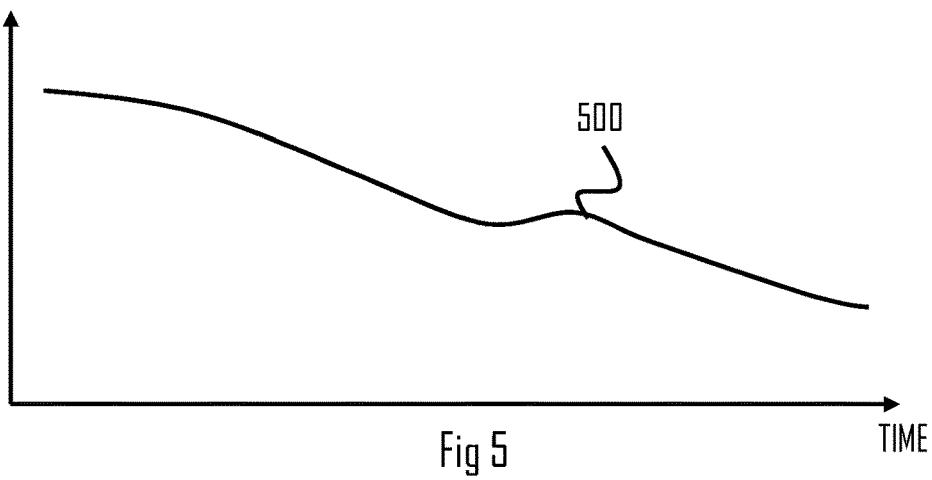
FIG. 5 illustrates a curve of a parameter managing selections in the process of any one of FIGS. 2 to 4.

In both cases, the threshold may be made variable and dependent on the time or number of iterations the optimization has performed such that, as the optimization progresses, it becomes less probable to maintain the change if the change degrades the overall performance. Parameter T may control this feature. The optimization may be considered to follow the principles of simulated annealing which is a term generally used in the field of system simulations. Annealing draws analogy from an annealing process in metallurgy. When used in the present optimization process, the parameter T may be considered as temperature of the annealing process. As the process progresses, the temperature generally decreases and, eventually when the temperature is sufficiently low, the process ends. Now, the temperature factor T may follow a preset temperature curve, of which an embodiment is illustrated in FIG. 5. The temperature T may have a generally decreasing trend over time, although it may have portions where the temperature remains unchanged for a period of time or even increases before continuing the decrease (see item 500).

In an embodiment, the value of T may be computed from a total number of iterations allowed for the process. For example, the value of T may be defined as:

$$T=T_{max}*(1-i/\text{MAXITER})$$

where $T_{max}$ is the maximum temperature at the start of the optimization process, i is the current iteration index and MAXITER is the number of iterations when the optimization process ends.

Upon determining whether or not to maintain the change, block 410 may be processed. In block 410, the process determines whether or not to carry out another iteration. When using the parameter MAXITER, block 410, may compare the index i with MAXITER. If i>MAXITER, the process may end. Otherwise, the process may return to block 304 for another iteration. Instead of a fixed value of the maximum number of iterations, block 410 may make the decision on the basis of overall performance improvement, for example. If the overall performance has not improved over a determined number N of consecutive iterations [i−N−1:i], the process may end. Otherwise, the process may continue in block 304. The number of iterations may be high, e.g. for 500 cells and 20 000 terminal devices about 5 million iterations may be performed before ending the optimization.

When the optimized association model has been completed, the network coordinator apparatus may output handover instructions to the access nodes through the cellular communication infrastructure, and the access nodes may execute the handovers according to the handover instructions. The number of handovers may be high so the network coordinator apparatus may control the rhythm with which the handover commands are issued to the access nodes. In order to expedite the handovers, the network coordinator apparatus may issue multiple handovers to occur in parallel. However, to avoid overloading the cellular communication system with too many handover requests, the network coordinator apparatus may limit the amount of parallelism by defining a maximum number of handovers performed in parallel.

In an embodiment, the process may employ affinity rules to reduce the number of handovers. For some cells, one or more terminal devices may be specified as preferred terminal devices which are preferred to stay associated in the cell. For such preferred terminal devices, the link performance between the terminal device and the cell may be artificially improved to indicate higher link performance than an actual link performance. Accordingly, such a terminal device is more probably determined to be associated to the cell in the final solution of the optimization.

Figure 6:
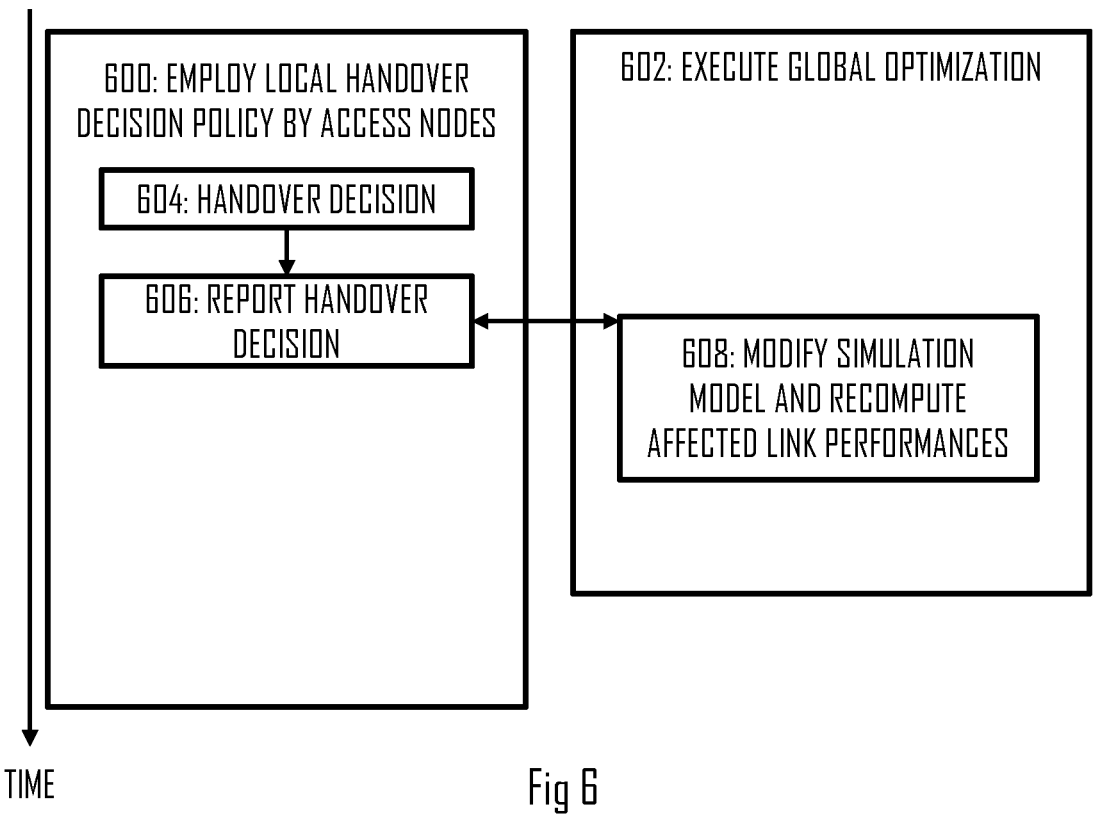
FIG. 6 illustrates a procedure of executing parallel handover decision policies according to an embodiment.

In an embodiment, the above-described association optimization algorithm and associated handover decision policy may be employed in parallel with a conventional handover decision policy. In some cases, the building of the globally optimized model may be too slow to account for rapid changes in a radio interface. For example, terminal devices in a speeding vehicle may require faster handover decisions. FIG. 6 illustrates an embodiment where the global optimization model is performed (block 602) in parallel with a local handover decision policy performed by the access nodes or other network elements close to the radio interface (block 600). The local handover decision policy may be arranged to carry out fast handover decisions for individual terminal device according to certain criteria: degradation of channel quality of the terminal device, mobility of the terminal device, etc. The criteria may be rather link specific although the criteria may employ certain other local characteristics such as a traffic load status in an individual cell. The global optimization process in block 602, however, pursues for a globally optimized model where the number of access nodes and terminal devices involved in the optimization is greatly higher than in the local handover decision policy.

A communication channel may be established between the two handover policies to account for the rapid changes made in block 600. The network coordinator apparatus may inform the access nodes involved in the global optimization process. The network coordinator apparatus may also inform the access nodes about the terminal devices involved in the global optimization process. Whenever an access node involved in the global optimization process makes a handover decision for a terminal device involved in the optimization process (block 604), the access node may inform the network coordinator apparatus about the handover (block 606) and, optionally, transmit a new neighbor list of the terminal device to the network coordinator apparatus. The terminal device itself may equally update the channel qualities towards detectable cells to the network coordinator apparatus. Upon receiving the information on the handover of the terminal device, the network coordinator apparatus may modify contents of the terminal device in the cache to force the new association of the terminal device to the model and update of corresponding link performance and cell-specific performances of the old and new cell (block 608).

Figure 7:
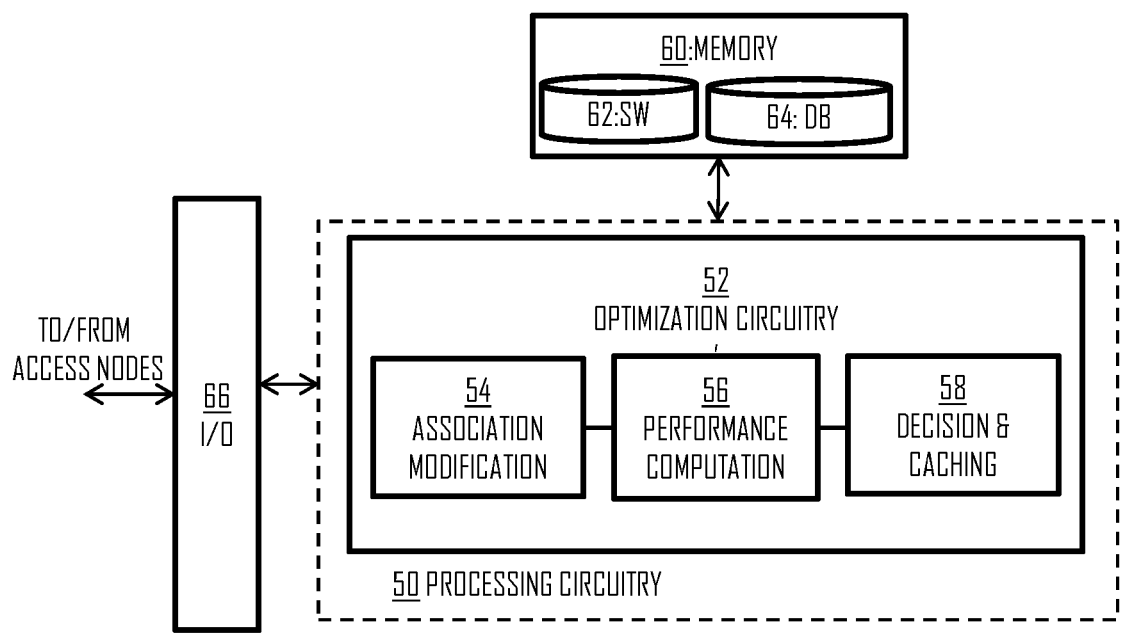
FIG. 7 illustrates a block diagram of an apparatus according to an embodiment of the invention.

FIG. 7 illustrates a block diagram of the network coordinator apparatus according to an embodiment of the invention. The apparatus may be comprised in one or more server computers in the cellular communication system or outside the cellular communication system. The apparatus may employ one or more physical or virtual servers to execute the global optimization process. Accordingly, the apparatus may be provided by a single processing system or a distributed processing system. The apparatus may be, for example, one or more circuitries or one or more chipsets in such computers. The apparatus may be an electronic device comprising electronic circuitries.

Referring to FIG. 7, the apparatus may comprise a processing circuitry 50 such as at least one processor, and at least one memory 60 including a computer program code (software) 62 wherein the at least one memory and the computer program code (software) are configured, with the at least one processor, to cause the apparatus to carry out any one of the embodiments of the network coordinator apparatus performing the optimization of the associations, as described above. The computer program code may define the simulation model 132 for the global optimization process, as described above.

The memory 60 may be implemented using any suitable data storage technology, such as semiconductor based memory devices, flash memory, magnetic memory devices and systems, optical memory devices and systems, fixed memory and removable memory. The memory may comprise a configuration database 64 for storing the cache 310 and the measurement data 134.

The apparatus may further comprise a communication interface (I/O) 66 comprising hardware and/or software for realizing communication connectivity according to one or more communication protocols. The communication interface 66 may provide the apparatus with communication capabilities to communicate in the cellular communication system and/or in another wireless access network. The communication interface may, for example, provide an interface to access nodes of the cellular communication system.

The processing circuitry 50 may comprise an optimization circuitry 52 configured to carry out the building of the globally optimized operation model for the associations. The optimization circuitry 52 may comprise an association modification circuitry 54 configured to execute block 304 and output, upon executing block 304, an instruction to a performance computation circuitry 56 configured to execute blocks 306 and 308 or any one of their embodiments. Upon computing the new overall performance, the performance computation circuitry 56 may output the newly computed values to a decision & caching circuitry 58 configured to perform blocks 402 to 408 or, in general, make the decision on whether or not maintain the change on the basis of the performance values received from the performance computation circuitry 56. Upon determining to maintain the change, the decision and caching circuitry 58 may update the cache 310, as described above.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 2 to 6 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method, comprising:
   acquiring, by a network coordinator apparatus, measurement data indicating link conditions between access nodes and terminal devices served by the access nodes of a cellular communication system;
   building, by the network coordinator apparatus, a globally optimized operating model based upon the measurement data by at least simulating a change in at least one association between the access nodes and the terminal devices and determining, based upon the measurement data, an effect of the simulated change on overall performance of the cellular communication system; and
   upon completing said building, transmitting by the network coordinator apparatus one or more handover instructions for handover of an association of one or more of the terminal devices according to the built operating model,
   wherein said building is carried out as an iterative process where the network coordinator apparatus repeatedly carries out the change, recomputation of the overall performance, and decision on the basis of the resulting overall performance whether or not to maintain the change,
   wherein the network coordinator apparatus uses a threshold in determining whether or not to maintain the change, if the change degrades the overall performance,
   wherein a value of the threshold is changed during said building.

2. The method of claim 1, further comprising:
   determining, by the network coordinator apparatus before said building, initial overall performance of the cellular communication system, wherein said determining comprises determining a link performance of each link between the access nodes and the terminal devices and determining the initial overall performance of the cellular communication system as an aggregate of said link performances;
   caching said link performances; and
   when determining the effect of the change on the overall performance of the cellular communication system, recomputing link performances for only those associations that have been changed and recomputing the overall performance by using the cached link performances for those associations that were not changed and the recomputed link performances.

3. The method of claim 1, wherein the network coordinator apparatus maintains the change, if the change improves the overall performance.

4. The method of claim 1, wherein the changed association is selected randomly.

5. The method of claim 1, wherein the changed association is selected by considering traffic load in the cells provided by the access nodes.

6. The method of claim 1, further comprising employing, in addition to the global model employed for performing handovers, a local handover decision policy in at least some of the access nodes where, according to the local handover decision policy, an access node is configured to decide execution of a handover of a terminal device according to determined rules.

7. The method of claim 1, wherein the terminal devices form a subset of all terminal devices registered to the cellular communication system, and wherein the terminal devices are selected by the access nodes on a basis that they are in a connected state or currently transferring data in the cellular communication system.

8. The method of claim 1, wherein said building comprises:
   forming, in a simulation model, initial associations between the access nodes and the terminal devices that are different from current real associations between the access nodes and the terminal devices;
   employing the simulated changes to the associations of the simulation model; and
   wherein the handover instructions cause handover of the real associations.

9. A method, comprising:
   acquiring, by a network coordinator apparatus, measurement data indicating link conditions between access nodes and terminal devices served by the access nodes of a cellular communication system;
   building, by the network coordinator apparatus, a globally optimized operating model based upon the measurement data by at least simulating a change in at least one association between the access nodes and the terminal devices and determining, based upon the measurement data, an effect of the simulated change on overall performance of the cellular communication system; and
   upon completing said building, transmitting by the network coordinator apparatus one or more handover instructions for handover of an association of one or more of the terminal devices according to the built operating model,
   wherein said building is carried out as an iterative process where the network coordinator apparatus repeatedly carries out the change, recomputation of the overall performance, and decision on the basis of the resulting overall performance whether or not to maintain the change,
   wherein the network coordinator apparatus uses a threshold in determining whether or not to maintain the change, if the change degrades the overall performance,
   wherein said determining whether or not to maintain the change, if the change degrades the overall performance, comprises:
   generating a random value;
   comparing the random value with the value of the threshold and determining whether or not the random value is one of greater and lower than the value of the threshold;
   if the random value is said one of greater and lower than the value of the threshold, maintaining the change; and
   if the random value is not said one of greater and lower than the value of the threshold, rejecting the change.

10. An apparatus, comprising:
    at least one processor; and
    at least one memory including a computer program code, wherein the at least one memory and the computer program code are configured, with the at least one processor, to cause the apparatus to:
    acquire measurement data indicating link conditions between access nodes and terminal devices served by the access nodes of a cellular communication system;
    build a globally optimized operating model based upon the measurement data by at least simulating a change in at least one association between the access nodes and the terminal devices and determining, based upon the measurement data, an effect of the simulated change on overall performance of the cellular communication system;

upon completing said building, transmit one or more handover instructions for handover of an association of one or more of the terminal devices according to the built operating model;

perform said building as an iterative process where the apparatus is configured to repeatedly carry out the change, recomputation of the overall performance, and decision on the basis of the resulting overall performance whether or not to maintain the change; and use a threshold in determining whether or not to maintain the change, if the change degrades the overall performance, wherein the at least one memory and the computer program code are configured, with the at least one processor, to cause the apparatus to change a value of the threshold during said building.

11. The apparatus of claim 10, wherein the at least one memory and the computer program code are configured, with the at least one processor, to cause the apparatus to:

determine, before said building, an initial overall performance of the cellular communication system, wherein said determining comprises determining a link performance of each link between the access nodes and the terminal devices and determining the initial overall performance of the cellular communication system as an aggregate of said link performances;

caching said link performances; and when determining the effect of the change on the overall performance of the cellular communication system, recomputing link performances for only those associations that have been changed and recomputing the overall performance by using the cached link performances for those associations that were not changed and the recomputed link performances.

12. The apparatus of claim 10, wherein the at least one memory and the computer program code are configured, with the at least one processor, to cause the apparatus to maintain the change, if the change improves the overall performance.

13. The apparatus of claim 10, wherein the at least one memory and the computer program code are configured, with the at least one processor, to cause the apparatus to select the changed association randomly.

14. The apparatus of claim 10, wherein the at least one memory and the computer program code are configured, with the at least one processor, to cause the apparatus to select the changed association by considering traffic load in the cells provided by the access nodes.

15. The apparatus of claim 10, further comprising said plurality of access nodes or other network elements being configured to perform local handover decisions independently of the global model and according to determined rules.

16. The apparatus of claim 10, further comprising the access nodes, wherein the terminal devices form a subset of all terminal devices registered to the cellular communication system, and wherein the access nodes are configured to select the terminal devices on a basis that they are in a connected state or currently transferring data in the cellular communication system.

17. The apparatus of claim 10, wherein the at least one memory and the computer program code are configured, with the at least one processor, to cause the apparatus to perform said building by carrying out at least the following:

forming, in a simulation model, initial associations between the access nodes and the terminal devices that are different from current real associations between the access nodes and the terminal devices;

employing the simulated changes to the associations of the simulation model; and wherein the handover instructions cause handover of the real associations.

18. The apparatus of claim 10, further comprising a communication interface configured to provide a network connection with the access nodes, to receive the measurement data, and to transmit the handover instructions.

19. An apparatus, comprising:

at least one processor; and at least one memory including a computer program code, wherein the at least one memory and the computer program code are configured, with the at least one processor, to cause the apparatus to:

acquire measurement data indicating link conditions between access nodes and terminal devices served by the access nodes of a cellular communication system;

build a globally optimized operating model based upon the measurement data by at least simulating a change in at least one association between the access nodes and the terminal devices and determining, based upon the measurement data, an effect of the simulated change on overall performance of the cellular communication system;

upon completing said building, transmit one or more handover instructions for handover of an association of one or more of the terminal devices according to the built operating model;

perform said building as an iterative process where the apparatus is configured to repeatedly carry out the change, recomputation of the overall performance, and decision on the basis of the resulting overall performance whether or not to maintain the change; and use a threshold in determining whether or not to maintain the change, if the change degrades the overall performance, wherein the at least one memory and the computer program code are configured, with the at least one processor, to cause the apparatus to perform said determining whether or not to maintain the change, if the change degrades the overall performance, be carrying out at least the following:

generating a random value;

comparing the random value with the value of the threshold and determining whether or not the random value is one of greater and lower than the value of the threshold;

if the random value is said one of greater and lower than the value of the threshold, maintaining the change; and if the random value is not said one of greater and lower than the value of the threshold, rejecting the change.

20. A computer program product embodied on a non-transitory computer-readable medium, said computer-readable medium encoded with instruction that, when executed by computer, cause the computer to execute the method according to claim 1.

* * * * *